2,748,146
THIOPHOSPHORIC ACID ESTERS OF 3-HALOGEN-HYDROXY-COUMARINS

Gerhard Schrader, Opladen-Bruchhausen, Germany, assignor to Farbenfabriken Bayer Aktiengesellschaft, Leverkusen, Germany, a corporation of Germany No Drawing. Application July 22, 1952,
Serial No. 300,324

Claims priority, application Germany July 30, 1951

4 Claims. (Cl. 260—343.2)

The present invention relates to new esters of thiophosphoric acid and to a method of making the same; more particularly it relates to compounds of the following general formula:

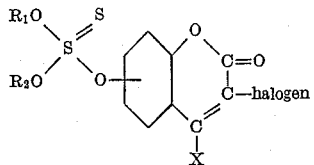

In this formula $R_1$ and $R_2$ stand for alkyl radicals, preferably lower alkyl radicals, which may be the same or different, and X stands for hydrogen or alkyl, preferably methyl.

The new compounds are obtainable by reacting dialkyl-chloro-thionophosphates with 3-halogen-hydroxy-coumarins which may be substituted by alkyl in the 4-position. The reaction is carried through in the presence of acid-binding agents at elevated temperature, as a rule at temperatures between 50 and 100° C. Preferably the reaction is performed in the presence of a diluent in which the 3-halogen-hydroxy-coumarins are easily soluble. Particularly suited solvents of this kind are ketones, e. g. acetone, methyl ethyl ketone, methyl propyl ketone. To accelerate the reaction the addition of a small quantity of finely powdered copper to the mixture may be expedient.

The new compounds are mostly well crystallizing colorless substances. They are distinguished by an excellent insecticidal effect in particular against fly larvae and cotton pests, such as pink boll worm and boll weevil, and by a low toxicity towards warm-blooded animals.

The following table shows the insecticidal effect of some of the new compounds towards fly larvae:

| Compound | Concentration Percent | Killing Effect Percent |
|---|---|---|
| (CH₃O)₂P(S)–O–[coumarin]–Cl, CH₃ | 0.000001 | 10 |
| (C₂H₅O)₂P(S)–O–[coumarin]–Cl, CH₃ | 0.000001 | 100 |

| Compound | Concentration Percent | Killing Effect Percent |
|---|---|---|
| (C₂H₅O)₂P(S)–O–[coumarin]–Br, CH₃ | 0.00001 | 100 |
| in comparison to: (C₂H₅O)₂P(S)–O–[coumarin]–H, CH₃ | 0.01 | 100 |

The present invention is illustrated by the following examples without, however, being restricted thereto:

Example 1

84 grams of 3-chloro-4-methyl-7-hydroxycoumarin are finely pulverized and suspended in 400 cc. of methyl ethyl ketone. To this suspension 42 grams of sifted dry potassium carbonate and 2 grams of copper powder are added. 66 grams of dimethyl-chloro-thionophosphate are run into the mixture at 75° C. with stiring, and the temperature is maintained for about 3 hours while stirring is continued. The mixture is then cooled, the salts are filtered off, and the filtrate is freed from the solvent by evaporation. The solid residue obtained is re-crystallized from methanol. 110 grams of the dimethyl thiophosphoric acid ester of the 4-methyl-3-chloro-7-hydroxycoumarin are obtained. The compound crystallizes in colorless needles and has a melting point of 108° C. It corresponds to the formula:

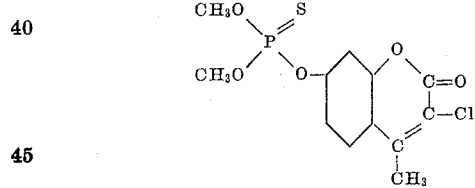

Example 2

84 grams of 3-chloro-4-methyl-7-hydroxycoumarin are suspended in 400 cc. of methyl ethyl ketone. 42 grams of pulverized and sifted potassium carbonate and 2 grams of copper powder are added thereto. 72 grams of diethyl-chloro-thionophosphate are run into the mixture at 75° C. with stirring. The temperature is maintained at 75–85° C. for further 15 minutes while stirring is continued. The mixture is then cooled, the salts are separated, the solvent is evaporated and the residue is re-crystallized from ethanol. 105 grams of the diethyl thiophosphoric acid ester of the 4-methyl-3-chloro-7-hydroxycoumarin with a melting point of 95° C. are obtained. The new compounds correspond to the formula:

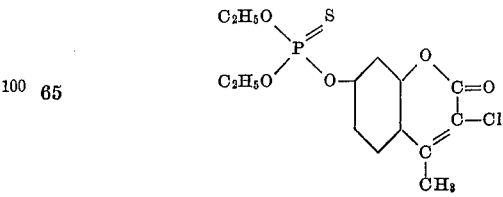

Example 3

47 grams of 4-methyl-3-bromo-7-hydroxycoumarin are dissolved in 150 cc. of methyl propyl ketone. 21 grams of finely pulverized potassium carbonate and 1 gram of copper powder are added thereto. Thereafter 36 grams of diethylchloro-thionophosphate are added at 85° C., and the temperature is maintained for 12 hours. After working up in the usual manner 50 grams of the diethyl thiophosphoric acid ester of the 4-methyl-3-bromo-7-hydroxycoumarin are obtained. After recrystallizing from alcohol the new substance has a melting point of 105° C.; it corresponds to the formula:

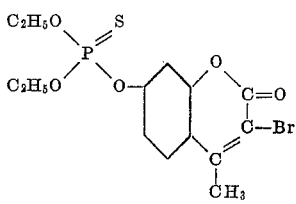

I claim:
1. Esters of thiophosphoric acid corresponding to the general formula:

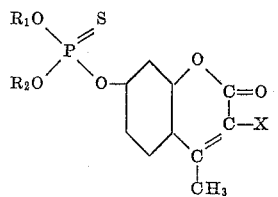

wherein $R_1$ and $R_2$ stand for lower alkyl radicals and X is a member of the group consisting of chlorine and bromine.

2. The compound of the formula:

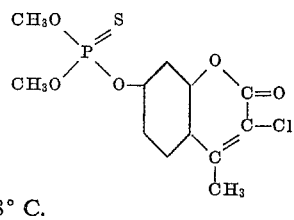

melting at 108° C.

3. The compound of the formula:

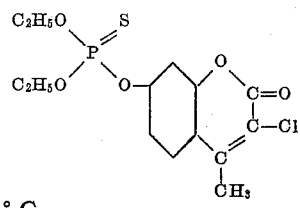

melting at 95° C.

4. The compound of the formula:

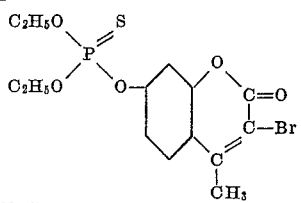

melting at 105° C.

References Cited in the file of this patent

UNITED STATES PATENTS

| | | |
|---|---|---|
| 1,995,247 | Haring | Mar. 19, 1935 |
| 2,583,744 | Schrader | Jan. 29, 1952 |
| 2,657,229 | Orochena | Oct. 27, 1953 |

OTHER REFERENCES

Ivy et al.: J. Econ. Entom. 43, 614-619 (1950).